No. 859,586. PATENTED JULY 9, 1907.
J. L. SEWALL.
GRAPPLING TONGS.
APPLICATION FILED NOV. 13, 1905.

Witnesses:
J. Henry Parker
Aline Tarr

Inventor.
John L. Sewall
by Macleod, Calver, Copeland & Dike
Attorneys

UNITED STATES PATENT OFFICE.

JOHN L. SEWALL, OF RANDOLPH, MASSACHUSETTS.

GRAPPLING-TONGS.

No. 859,586.  Specification of Letters Patent.  Patented July 9, 1907.

Application filed November 13, 1905. Serial No. 286,981.

*To all whom it may concern:*

Be it known that I, JOHN L. SEWALL, a citizen of the United States, residing at Randolph, county of Norfolk, State of Massachusetts, have invented a certain new and useful Improvement in Grappling-Tongs, of which the following is a specification, reference being had therein to the accompanying drawings.

In lifting heavy weights, such for instance, as rough stone, timber, boxes, etc., it is frequently desirable to have some instrument which shall seize firmly upon the article to be lifted and shall afterward release it quickly.

My invention has for its object to produce a pair of grappling tongs which may be used to lift a variety of such articles, and which shall hold them as securely as would a chain such as is frequently used.

A pair of grappling tongs embodying my invention may be readily caused to seize the article to be lifted, and thereafter holds it firmly, but may be released instantly. It also releases the load automatically when the load is deposited on the ground. The construction of the device embodying my invention is also such that the heavier the load the tighter the grip with which the tongs seize and hold it.

My invention will be fully understood from the following description taken in connection with the accompanying drawings, and the novel features thereof are pointed out and clearly defined in the claims at the close of the specification.

Figure 1:
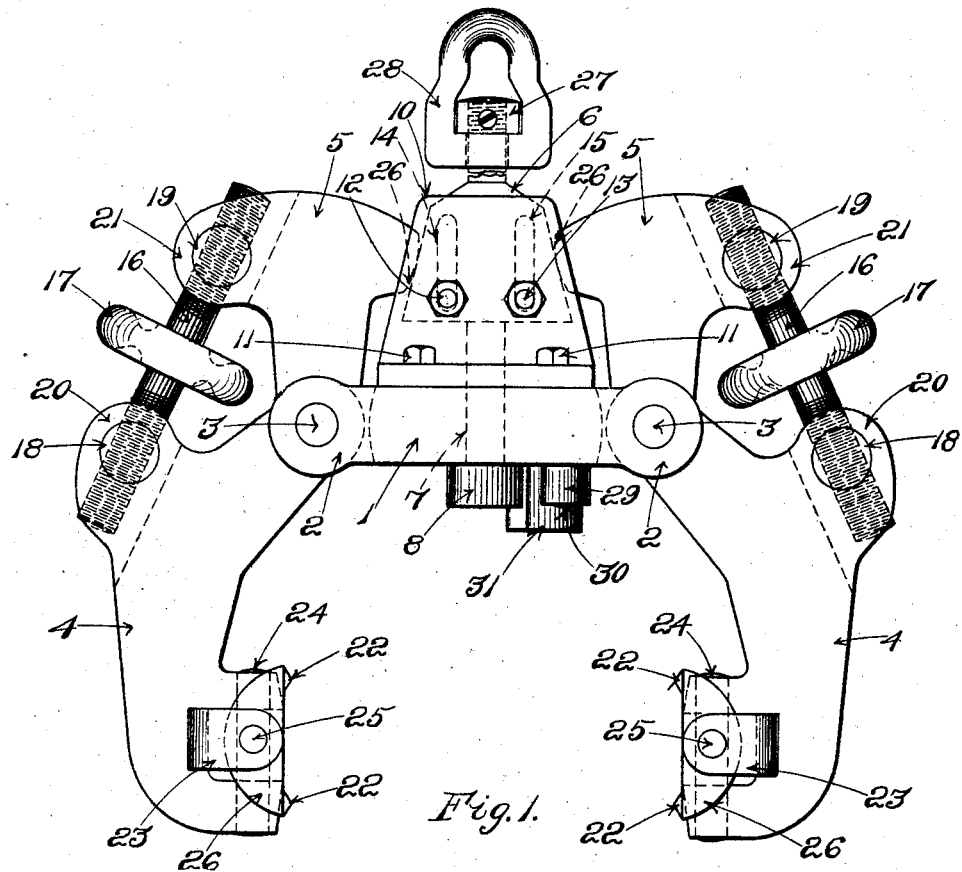
Figure 2:
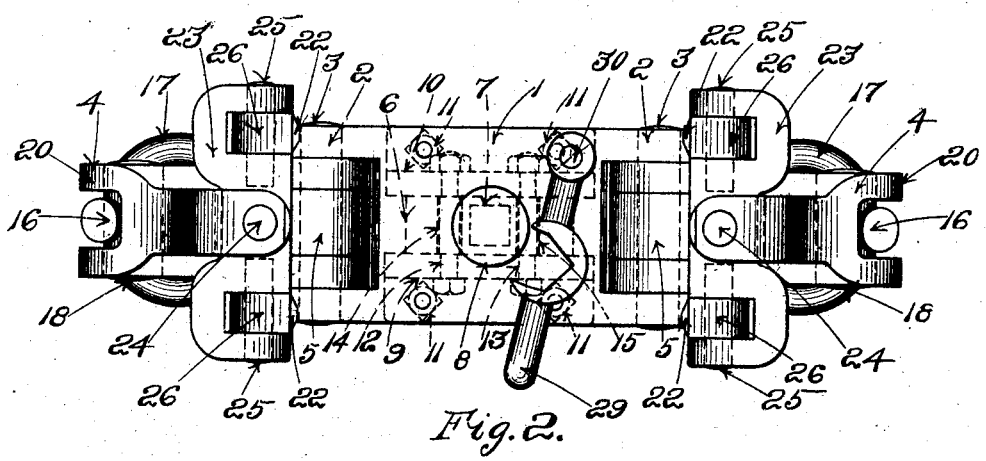

Referring to the drawings,—Figure 1 is an elevation of a device embodying my invention. Fig. 2 is a bottom view thereof.

In the drawings,—1 designates the frame of the device which is provided at each end with a pair of projections 2, 2, through which pass pivots 3, 3, upon which are fulcrumed the gripping members of the tongs. In practice I make the gripping members in two parts 4 and 5, the lower one 4 being adapted to engage the load, while the upper engages a wedge or cam 6 and is accordingly provided with a slightly curved surface 26 for engagement with the said wedge. This cam or wedge 6 has straight or slightly curved sides as may be most convenient. The said cam or wedge 6 is provided with a stem 7 movable vertically in a hole in the frame 1. In practice I make the said stem 7 square in cross section to prevent its rotation and consequent displacement. I provide the lower end of the stem 7 with a collar 8 which prevents the wedge and attached stem being drawn through the hole in the frame 1, and the upper end with a collar 27 and swivel or shackle 28 by means of which the grappling tongs are attached to the rope or chain by means of which they are lifted. To insure further security of the parts and to prevent displacement of the wedge 6 and upper arms 5, 5, I guide the wedge 6 between two side plates 9 and 10 which are secured to the frame 1 by the cap screws 11. I also provide two transverse bolts 12 and 13 adapted to work in slots 14 and 15 in the wedge 6. This arrangement of the parts insures all the parts remaining in their proper positions even though the device receives very hard usage as is likely to be the case with such articles.

Between the upper arm 5 and the lower arm 4, I place an adjusting screw 16 provided with a hand wheel 17, and having right and left hand screw threads at its respective ends. The ends of the adjusting screw 16 engage studs 18 and 19 which are free to rotate in holes in forked projections 20 and 21 on the lower and upper arms respectively. The said studs 18 have each a hole drilled through them at right angles with the longitudinal axis, and this hole is tapped for the reception of the end of the adjusting screw 16. It will thus be seen that when the adjusting screw 16 is rotated about its axis by means of the hand wheel 17, the forked projections 20 and 21 of the lower and upper arms 4 and 5 are drawn nearer or spread more widely apart according to the direction of rotation. The two arms 4 and 5 taken together form substantially a single member of the tongs pivoted at 3, and this member is capable of being given different shapes by means of the relative movement of the two parts about the stud 3 produced by means of rotation of the adjusting screw 16. If it is required to lift a smaller article than that for which the tongs are arranged, it is only necessary to turn the adjusting screw 16 until the space between the lower extremities of the lower arms 4 is approximately equal to the width of the article to be lifted.

In order that the grappling tongs may be better adapted to seize irregular objects or those having rough side surfaces, I sometimes provide the lower ends of my tongs with gripping points which are constructed in the following manner. At the lower end of each of the gripping members is located a piece or yoke 23 which is attached to the gripping member by means of a vertical stud 24, so that the said piece or yoke is capable of being swung about the said stud 24 in a horizontal plane. Pivoted to this yoke 24 by two studs 25 which are at right angles with the first mentioned stud 24, are blocks 26 each of which is provided with two points 22 for engagement with the side of the article to be lifted. It will be seen from the foregoing that each of the four points are enabled to engage with the surface, although the general plane of the said surface is at an angle, or although the surface is rough and uneven, since the elements described form substantially a universal joint between the lower arm 4 and the points 22 which engage the load.

In using my improved grappling tongs, they are lowered over the object to be lifted, and the adjusting screw 16 moved until the jaws are separated by a distance about equal to the width of the object to be lifted. When the rope attached to the device is tightened to lift the load, the entire weight of the tongs and the load is supported upon the wedge 6 which tends to separate the upper arms 5 and to cause the gripping points 22 located at the lower extremities of the lower arm 4 to engage the load more firmly. There is little or no danger of the tongs becoming accidentally disengaged from the load, because the entire weight of the device and its load tends to hold the load more securely. When it is desired to release the load, it is placed on the ground, and the further slackening of the rope lowers the wedge 6 and releases the two arms.

As it is sometimes desirable to lift the grappling tongs by the rope without causing the wedge to be lifted vertically with relation to the frame 1, I provide a locking lever 29 pivoted at 30 to the under side of the frame 1, and provided with a collar 31. When the lever 29 is swung about its pivot 30, the stem 7 and collar 8 being in their lowermost position, the collar 31 passes between the collar 8 and the under side of the frame 1, and serves to prevent the stem 7 and collar 8 being thereafter lifted, so that the collar 8 will come into engagement with the under side of the frame 1. When the parts just referred to are in this position, the two arms of the tongs are free to move about their pivots 3, and may be conveniently lowered over the load which is intended to be lifted by the tongs. When it is desired that the gripping points engage the load, the device having been placed in position, the lever 29 is moved out of engagement and into the position shown in Fig. 2, and the device is in condition to be operated.

What I claim is:—

1. The improved grappling tongs comprising the frame, a pair of gripping members pivoted to the said frame and each made in two parts adjustable with relation to each other, operating means engaging the said pivoted gripping members, and a shackle attached to the said operating means, whereby the load to be lifted by the said grappling tongs is carried by the said operating means.

2. The improved grappling tongs comprising the frame, a pair of gripping members pivoted to the said frame and each made in two parts adjustable with relation to each other, a wedge engaging the said pivoted gripping members, and a shackle attached to the said wedge whereby the load to be lifted by the said grappling tongs is carried by the said wedge.

3. The improved grappling tongs comprising the frame, a pair of gripping members pivoted to the said frame, and each made in two parts adjustable with relation to each other, and a wedge engaging the upper ends of the said pivoted gripping members, whereby vertical movement of the said wedge causes the said gripping members to engage the load.

4. The grappling tongs comprising a frame, operating means a pair of pivoted gripping members made in two parts, the lower of said parts engaging the load and the upper of said parts engaging the said operating means and an adjusting screw between the said upper and lower parts by means of which the said two parts of the gripping members may be positively positioned with relation to each other.

5. The improved grappling tongs comprising a frame, a pair of gripping members pivoted thereon, a wedge located between the upper ends of the said pivoted members and vertically movable with relation thereto, and means interposed between the wedge and the frame to retain the said wedge out of contact with the said pivoted gripping members when desired.

6. The improved grappling tongs comprising a frame, a stem, a wedge thereon, a collar on the said stem, a second collar which may be interposed between the first mentioned collar and the said frame, and gripping members pivoted to the said frame and having their upper ends engaging the said wedge and their lower ends adapted to engage the load.

7. The improved grappling tongs, comprising a frame, a pair of gripping members, a yoke pivoted to the lower extremity of the said gripping members, and gripping points pivotally mounted upon the said yoke and capable of movement in a plane at right angles with the plane of movement of the said yoke.

In testimony whereof I affix my signature, in presence of two witnesses.

JOHN L. SEWALL.

Witnesses:
GEORGE P. DIKE,
J. HENRY PARKER.